United States Patent [19]

Pelkey et al.

[11] Patent Number: 4,556,968

[45] Date of Patent: Dec. 3, 1985

[54] UNCONSTRAINED REMOVABLE PROTECTIVE COVER FOR OPTICAL DISK

[75] Inventors: Kathleen Pelkey; Franklin Kalk, both of Boulder, Colo.

[73] Assignee: Storage Technology Partners II, Louisville, Colo.

[21] Appl. No.: 481,009

[22] Filed: Mar. 31, 1983

[51] Int. Cl.⁴ .......................... G01B 15/34; G11B 7/00
[52] U.S. Cl. .................................. 369/287; 346/137; 346/135.1; 369/284
[58] Field of Search ............... 369/284, 287, 291, 292, 369/275; 346/135.1, 137

[56] References Cited

U.S. PATENT DOCUMENTS

| | | | |
|---|---|---|---|
| 4,013,296 | 3/1977 | Keeney | 369/291 |
| 4,074,282 | 2/1978 | Balas et al. | 346/135.1 |
| 4,331,966 | 5/1982 | Moe | 346/135.1 |
| 4,365,258 | 12/1982 | Geyer et al. | 369/284 |
| 4,380,016 | 4/1983 | Lehureau et al. | 369/284 |
| 4,435,801 | 3/1984 | Levin | 369/275 |

FOREIGN PATENT DOCUMENTS 2319993 11/1974 Fed. Rep. of Germany ...... 369/291

Primary Examiner—Steven L. Stephan
Attorney, Agent, or Firm—Ronald C. Williams; James R. Young

[57] ABSTRACT

An unconstrained removable protective cover for optical disks. With this apparatus a transparent protective cover can be mounted to an optical information recording disk wherein the different thermal expansion coefficients of the disk and the protective cover will not result in read write errors due to warping of the protective cover. An inner spacer ring is fixedly bonded to the inner diameter of the disk substrate and the protective cover. However, on the outer perimeter of the disk, a U-shaped spacer ring is fitted thereon and fixedly mounted to the outer perimeter of the transparent protective cover. This allows the transparent protective cover to expand and contract relative to the disk substrate by lateral movement of the spacer ring relative to the disk, without warping of the protective covering. A plurality of methods of mounting the outer spacer ring to the protective covering are disclosed.

2 Claims, 7 Drawing Figures

UNCONSTRAINED REMOVABLE PROTECTIVE COVER FOR OPTICAL DISK

BACKGROUND OF THE INVENTION

1. Field of the Invention

This invention relates to the field of disk shaped information recording media, and in particular to the field of providing protective covers for such optical information disk-shaped recording media.

2. Description of the Prior Art

In optical disk information recording systems, the data is recorded on radiation sensitive media. The disk is ordinarily comprised of a disk-shaped substrate, usually aluminum, onto which a thin film of radiation sensitive media is deposited. Because of the optical nature of the surface of this disk, the surface ordinarily is in need of protection from dust and dirt contamination as well as for providing a means of defocusing such dust particles. In the prior art, this protection has been provided by a radiation-transmissive protective covering, which is fixedly secured to the disk surface above the media. The prior art has taught the use of both "thin" media covers (on the order of approximately 0.005 inches thick) and "thick" media cover (on the order of approximately 0.040 inches. Thick protective covers or windows have been attractive because of their ease of manufacture and relatively tighter mechanical tolerances, thus allowing for repeatable and accurate optical qualities.

In the prior art in which a relatively thick protective cover is used, the prior art has taught the bonding of inner and outer diameter spacers to the disk substrate and thereafter bonding the protective window to the inner and outer diameter spacers. However, because of the different materials used to form the protective cover and the disk substrate, the protective cover usually has a thermal expansion coefficient that is different from that of the support substrate. It has been found that if rigid adhesives are used to bond the protective cover the spacers and the substrate together, a temperature change of 20° F. can result in a protective cover distortion of 5-10 mills, causing the protective cover to bow or warp relative to the disk surface. Such distortion can cause the aberration of the radiation beam, with resulting read and write errors, and can also degrade the device performance by effecting the dynamic stability of the rotating disk.

The prior art has addressed this problem by focusing on the proper selection of adhesives and spacer material in order to achieve a strong, but flexible bond. In U.S. Pat. No. 4,073,282, entitled "Radiation-Sensitive Record With Protected Sensitive Surface", issued Feb. 14, 1978, to Balas, Jr., et al, and assigned to U.S. Philips Corp., a transparent protective cover is disclosed for keeping dust away from the active layer of the disk and for keeping ablated material from being deposited upon the objective lens, wherein the protective cover is bonded to the disk substrate by an inner and an outer spacer ring, as discussed above. Work in the field of improving disk performance is predicated upon this basic patent.

Another approach to this problem is taken in U.S. Pat. No. 4,353,767, entitled "Method of Manufacturing An Optical Recording Disk", issued Oct. 12, 1982 to Wilkinson, and assigned to Discovision Associates, wherein a disk assembly is disclosed comprising a pair of transparent disks, each having a thicker inner and outer edge, such that when the thick edges are placed together, an interior chamber is formed. In this patent, either one or both of the inner disk surfaces can be coated with the active media layer, thus having the "spacer" rings manufactured as an integral part of the disk itself, eliminating the differential expansion problem. One problem with this patent is that should either of the protective surfaces be damaged, information recorded on the disk is effectively lost. An additional problem is the development of a transparent disk substrate which can meet the performance standards as found with aluminum substrates.

The present invention is an improvement over the prior art in that a mounting method is disclosed which will allow for the differential expansion of the disk substrate without warping of the protective cover. The disclosed invention is also an improvement in that the protective cover is removable thereby allowing a damaged window to be replaced or reused, as need be.

It is an object of the disclosed invention to provide a transparent protective cover for optical information recording disks.

It is another object of the disclosed invention to provide a transparent, low distortion, protective cover for optical information recording disks.

It is yet another object of the disclosed invention to provide a removable transparent protective cover for an optical information recording disks.

It is still another object of the disclosed invention to provide a reusable transparent protective cover for an optical information recording disks.

It is still yet a further object of the disclosed invention to provide an inexpensive means for mounting a transparent protective cover to optical information recording disks.

SUMMARY OF THE INVENTION

The disclosed invention, an unconstrained removable protective cover for optical disks, is comprised of a disk-shaped transparent protective cover which is fixed to the substrate of the optical recording disk by an inner and an outer spacer, wherein the outer spacer has in its lower interior perimeter, a U-shaped annular recess, in which is disposed the outer rim of the optical disk. The closely fixed, but unbonded, outer spacer ring, allows the transparent protective cover to expand or contract relative to the disk, without causing the transparent protective cover to warp or otherwise bend thereby minimizing optical wavefront distortion. The disclosed invention contemplates a number of different arrangements for attaching the protective cover to the outer spacer ring. In the specific embodiments disclosed herein, the protective cover is mounted to the spacer ring by bonding the protective cover to the upper surface of the spacer ring, by locating the outer perimeter of the spacer ring on the L-shaped shoulder on the upper portion of the spacer ring, by constructing the spacer ring and the protective cover as a single unit, and by providing for interlocking lips on the outer perimeter of the protective cover and the upper inner portion of the spacer ring, such that when inserted, the protective cover is locked into place in the spacer ring.

DETAILED DESCRIPTION OF THE PREFERRED EMBODIMENTS

Figure 1:
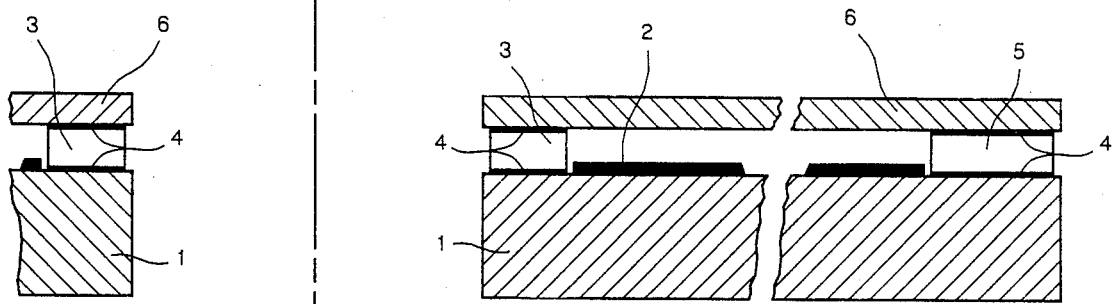
FIG. 1 is a partial cross section drawing of a prior art method of attaching a transparent protective cover to an optical disk surface.

FIG. 1 shows one of the most basic means in the prior art by which a disk substrate 1, upon which optical media 2 is coated, has mounted thereon an inner spacer ring 3, bonded with adhesive 4, and an outer spacer ring 5, also bonded with adhesive material 4, and wherein said spacer rings 3 and 5 are bonded with adhesive material 4 to a transparent protective covering 6. In operation, a radiation beam is directed onto the media 2 passing through transparent protective cover 6. One problem with this prior art is that with variations in temperature, this inflexible method of mounting will cause the transparent protective cover 6 to expand at a different rate than the substrate 1, causing the transparent protective cover 6 to bend or warp, thereby changing the optical path through which the radiation source strikes the media. The change in optical path causes read/write errors, as well as altering the dynamic characteristics of the disk assembly, resulting in instability during disk rotation.

Figure 2:
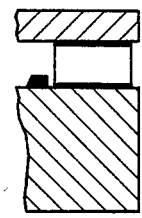
FIG. 2 is a partial cross section drawing of one embodiment of the disclosed invention, wherein the transparent protective cover is bonded to the upper surface of the outer spacer ring, and the inner spacer ring is constructed as an integral part of the inner rim of the transparent cover.
Figure 2:
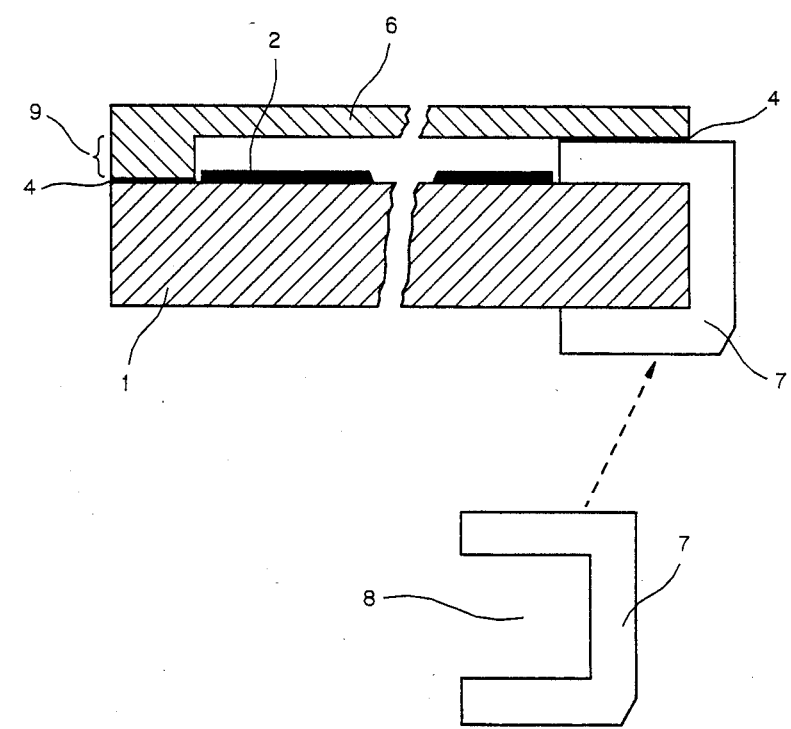

As shown in FIG. 2, the disclosed invention addresses this problem by providing for an unconstrained method of mounting an unconstrained spacer ring 7 to the outer perimeter of the disk 1. As shown in FIG. 2, the outer spacer ring 7 has an U-shaped interior recess 8 into which the outer perimeter of the disk 1 is inserted. This outer spacer ring 7 is not bonded to the disk 1 substrate, thereby allowing for the lateral sliding of the spacer ring 7 with respect to the disk 1. As shown in FIG. 2, in the simplest embodiment of the disclosed invention, the protective covering 6 is now bonded to the upper surface of the outer spacer ring 7 with adhesive 4. Also shown in FIG. 2, is an embodiment of the disclosed invention wherein an inner spacer rim 9 is formed as an integral portion of the transparent protective covering 6.

Figure 3:
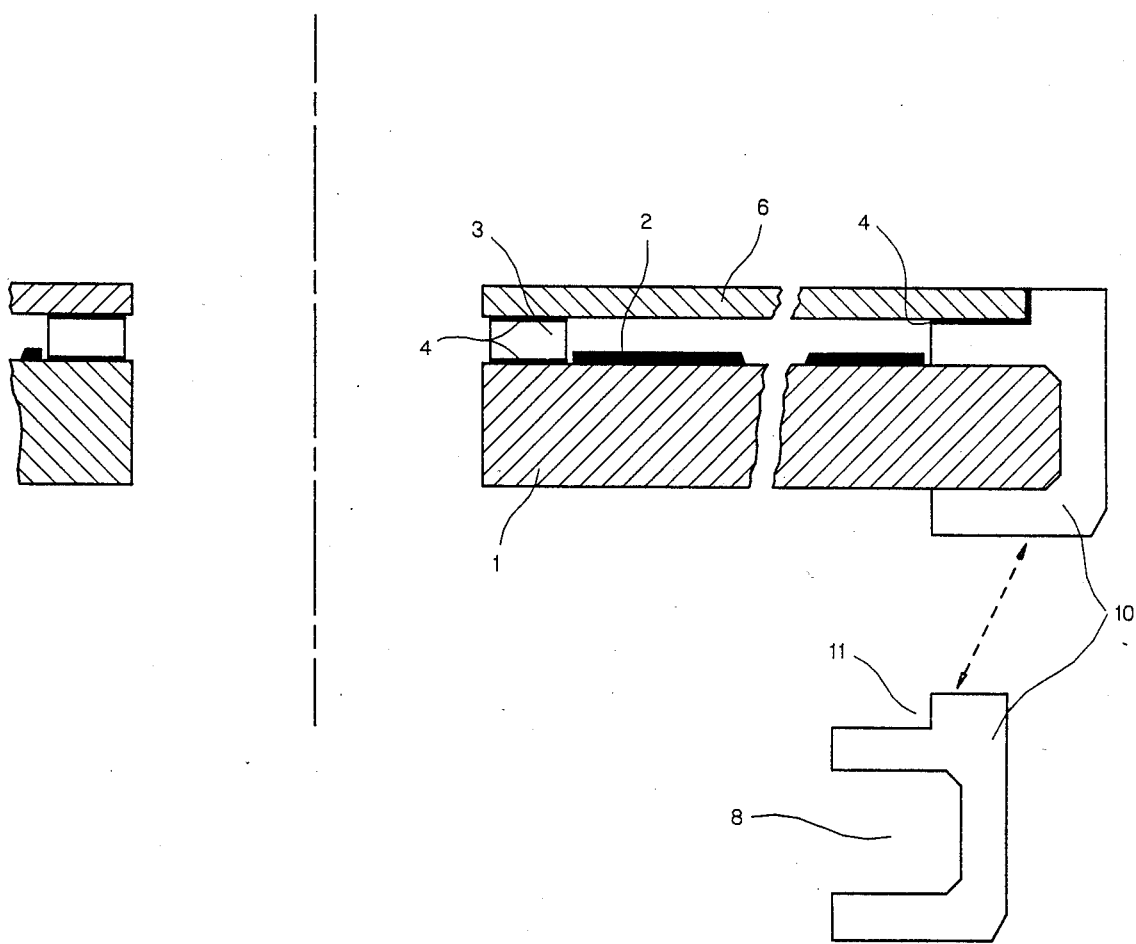
FIG. 3 is a partial cross section drawing of another embodiment of the disclosed invention wherein the inner spacer ring is bonded between the disk substrate and the protective cover, and the outer perimeter of the protective cover is bonded to an L-shaped shoulder on the upper portion of the outer spacer ring.

In FIG. 3, the outer spacer ring 10 is modified to have an upper interior shoulder 11 onto which the transparent protective cover 6 is inserted and bonded with adhesive 4. Also as shown in FIG. 3, the interior spacer ring 3 is bonded between the disk substrate 1 and the protective cover 6 with adhesive 4.

Figure 4:
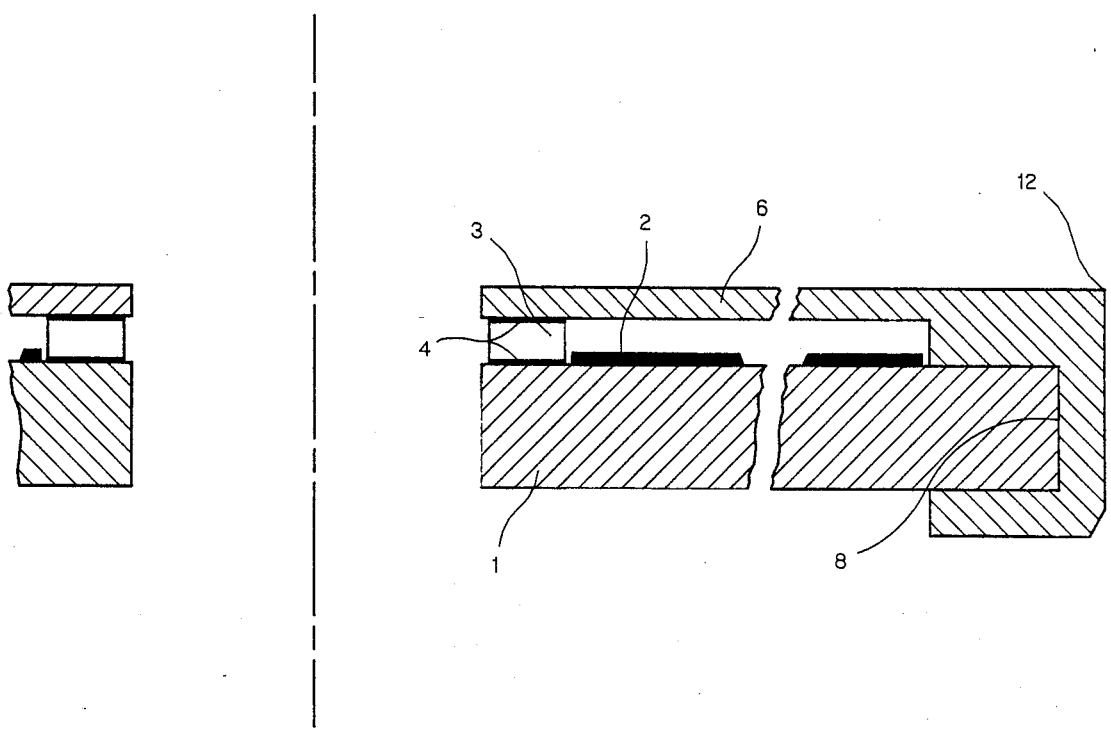
FIG. 4 is yet another cross section drawing embodiment of the disclosed invention wherein the outer spacer ring is formed as an integral portion of the protective cover.

As shown in FIG. 4, in another embodiment of the disclosed invention, the protective cover 6 is modified as such that the outer perimeter of the protective cover 6 is formed with an outer spacer rim 12 is formed as an integral component of the transparent cover 6, with the U-shaped annular channel 8 disposed around the outer perimeter of the disk substrate. The inner spacer ring 3 is bonded to the disk substrate 1 and the protective cover 6 with adhesive 4.

Figure 5:
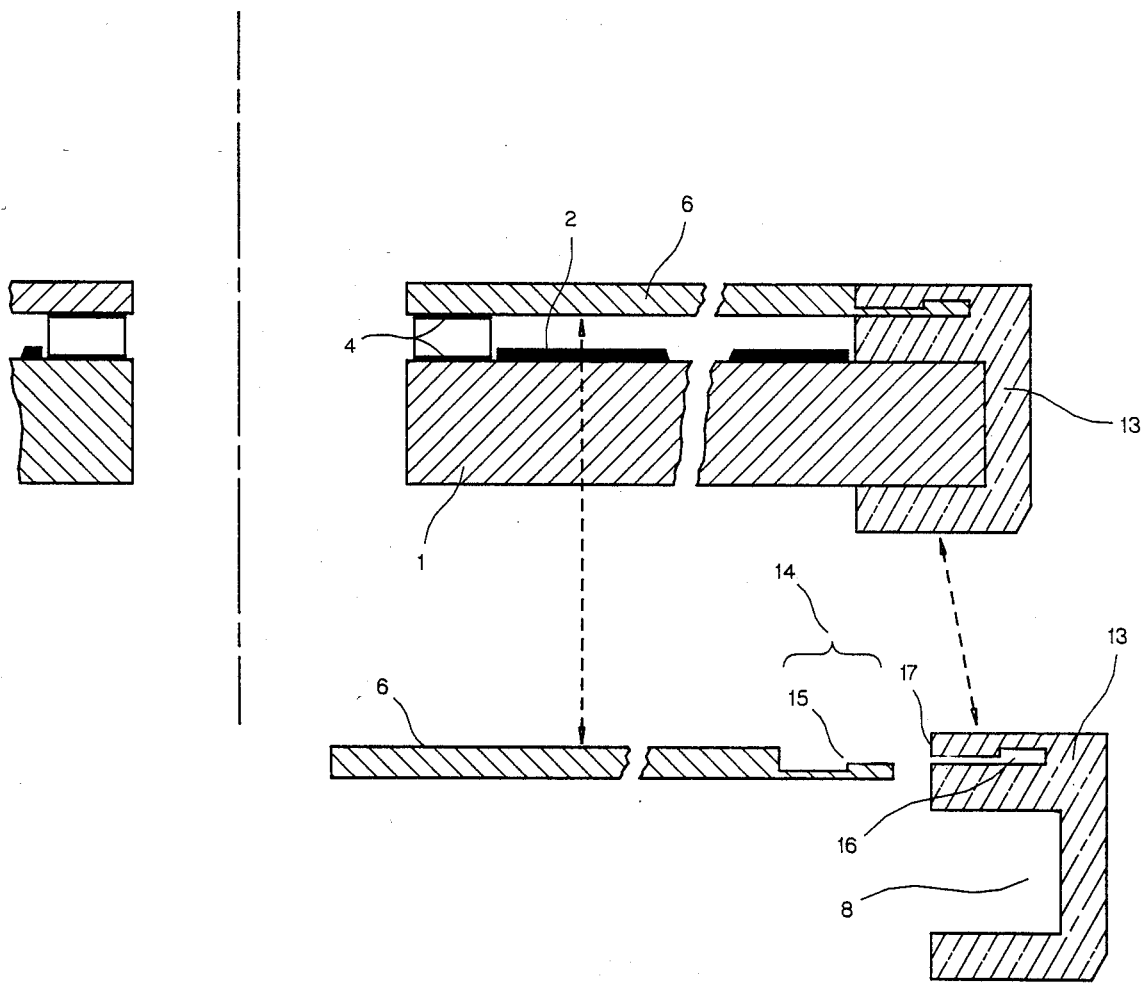
FIG. 5 is still yet another cross section drawing of another embodiment of the disclosed invention wherein the outer rim of the protective cover has a lip which is inserted into a second, U-shaped recess in the upper portion of the outer spacer ring, such that when the perimeter of the protective window is snapped into place, the protective cover and the outer spacer ring are interlocked.

In FIG. 5, attachment of the spacer ring 13 to the disk 1 and the protective cover 6 is achieved without adhesive bonding. In this embodiment, the outer perimeter 14 of the transparent protective cover 6 is modified to have a notch and lip section 15 which is inserted into a second U-shaped annular channel 16 in the upper portion of the spacer ring 13, said second U-shaped channel 16 also having a downward projecting lip 17 which cooperates with the notch 15 in the protective cover 6 to lock the spacer ring 13 into the protective cover 6.

Figure 6:
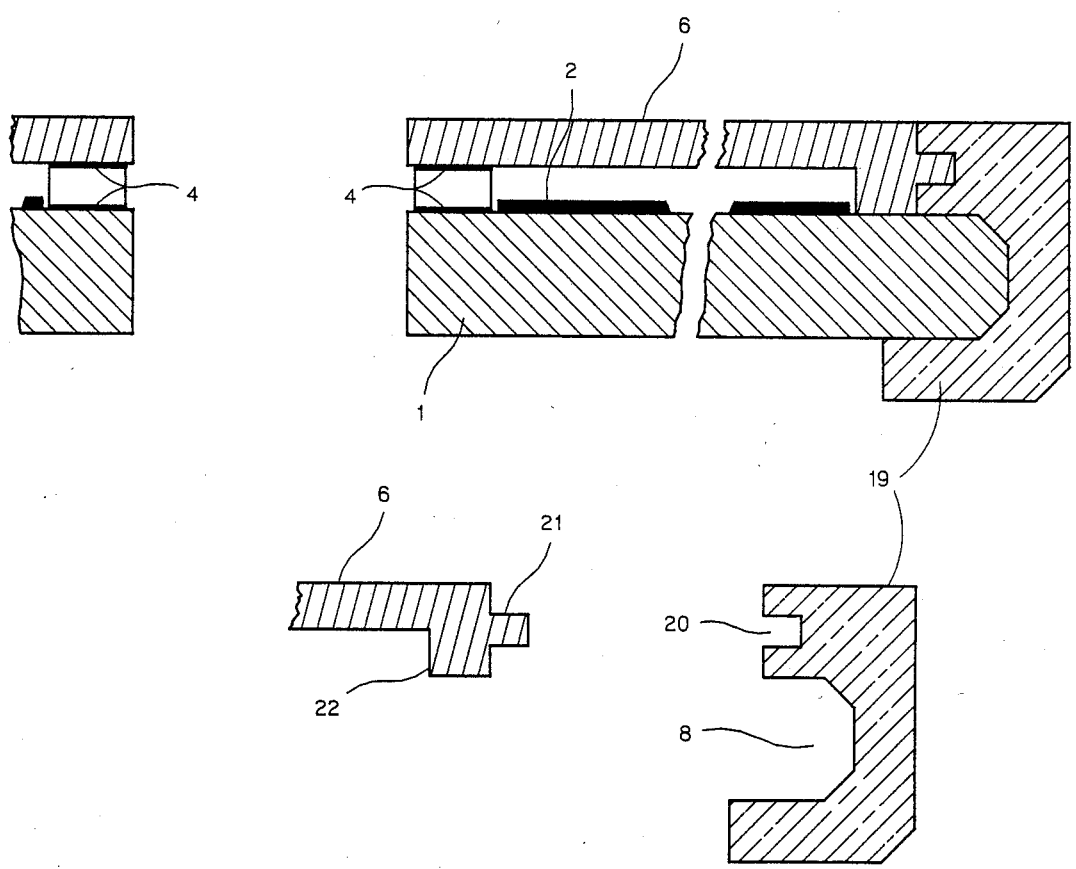
FIG. 6 is still yet another cross section drawing of yet another embodiment of the disclosed invention wherein the outer rim of the protective cover has a tongue which is inserted into a second, U-shaped recess in the upper portion of the outer spacer ring and a downward projecting rib for support which loosely rests on the disk substrate.

In FIG. 6 an embodiment is shown wherein the outer spacer ring 19 has a second upper U-shaped annular recess 20 into which a tongue 21 on the outer rim of the protective cover 6 is slidably inserted. The upper surface of the protective cover 6 is coplanar with the upper surface of the spacer ring 19. For added support, the protective cover 6 also has a downward projecting rib 22 which sets on the substrate 1 surface for support. As shown in FIG. 6, the outer rim of the disk substrate 1 is inserted into the lower annular recess 8.

Figure 7:
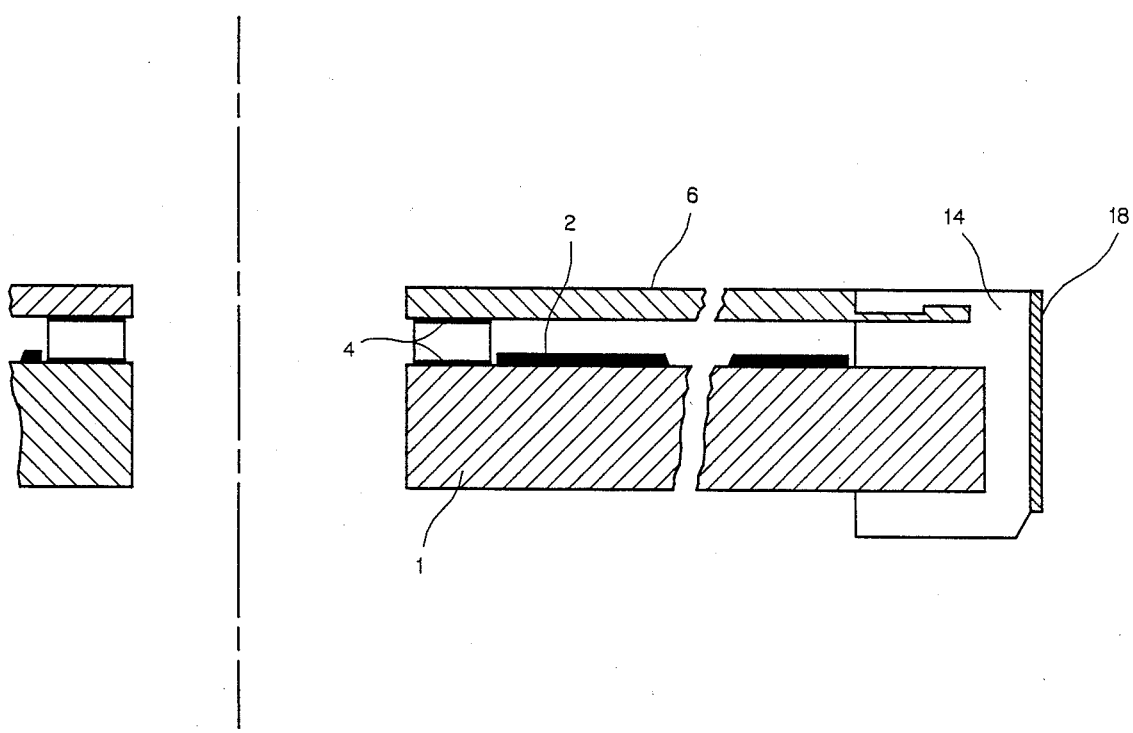
FIG. 7 shows a partial cross section drawing of the disclosed invention wherein a stiffening band is disposed around the outer circumference of the spacer ring to strengthen the lock between the spacer ring and the protective covering.

In FIG. 7, the locking embodiment of FIG. 5 is further modified by the addition of a stiffening band 18 which reinforces the spacer ring in retaining the protective cover 6 over the disk substrate 1. While this stiffening band 18 is illustrated with regard to only embodiment in FIGS. 5 and 7, it is contemplated that the restraining band can be used with any embodiment of this disclosed invention.

While a number of embodiments have been disclosed herein, it should be recognized that a plurality of different methods exists for securing the protective covering 6 to the basic outer spacer ring 7, and that basic spacer rings 3 and 7, can be modified in a plurality of different methods for said attachment.

We claim:

1. An apparatus for attaching a slidable and removable protective cover to an optical information recording disk, thereby allowing for the differential expansion of the disk and the protective cover without warping or bending of said protective cover, said apparatus comprising:

an optical information recording disk;

a disk-shaped protective cover to be mounted above the disk media bearing surface, said protective cover having an upward projecting outer lip around the outer circumference of the outer rim of said protective cover;

a first inner spacer ring, disposed between the disk and the protective cover, and fixedly bonded to said disk and protective cover;

a second, outer spacer ring, said spacer ring having a U-shaped annular recess on the lower interior circumference of said spacer ring, into which the outer rim of the disk is slidably disposed, and having an upper U-shaped annular recess, said recess having a downward projecting lip, such that when the outer rim of the protective cover is inserted into the upper annular recess, the protective cover lip and the spacer ring cooperate to lock the disk into the spacer ring.

2. An apparatus for attaching a slidable and removable protective cover of claim 1 further comprising a circular stiffening band, said band mounted around the outer diameter attachment means, thereby adding additional support to the slidable attaching means.

* * * * *